United States Patent [19]
Barbulesco et al.

[11] 3,724,622
[45] Apr. 3, 1973

[54] SPRING CLUTCH

[75] Inventors: Daniel J. Barbulesco; John R. Briar, both of Dayton, Ohio

[73] Assignee: General Motors Corporation, Detroit, Mich.

[22] Filed: Apr. 19, 1971

[21] Appl. No.: 135,084

[52] U.S. Cl............192/105 CE, 192/103 B, 192/114
[51] Int. Cl.............................................F16d 43/24
[58] Field of Search......192/105 CD, 105 CE, 103 B, 192/114, 105 BA

[56] References Cited

UNITED STATES PATENTS

| 846,193 | 3/1907 | Fellows | 192/105 CD |
|---|---|---|---|
| 1,972,915 | 9/1934 | Barton | 192/105 CE |
| R20,903 | 11/1938 | Royse | 192/105 CD |
| 3,625,326 | 3/1970 | Rix et al. | 192/105 CE |

FOREIGN PATENTS OR APPLICATIONS

| 528,856 | 5/1939 | Great Britain | 192/105 CE |
|---|---|---|---|

Primary Examiner—Charles J. Myhre
Assistant Examiner—Randall Heald
Attorney—Warren E. Finken, A. M. Heiter and John P. Moran

[57] ABSTRACT

A centrifugally-actuated spring clutch including a pair of oppositely disposed arcuate-shaped weight members, each of which has a first camming portion formed on its radially outward surface which, under the action of centrifugal force, engages a bent tab formed on an end of a coil-wound torque spring for causing the spring to expand to engage the inner peripheral surface of a drive member and thus be driven thereby, the torque spring, in turn, being connected via a connector plate to drive an output shaft. Manually rotatable pin means are included for engaging a second camming surface formed adjacent the free end of each of the weight members to prevent their response to centrifugal force during the seasons of the year when the air compressor need not be operative.

6 Claims, 2 Drawing Figures

INVENTORS
Daniel J. Barbulesco &
BY   John R. Briar

John P. Moran
ATTORNEY

SPRING CLUTCH

This invention relates generally to clutches and more particularly to centrifugally-actuated spring clutches for use with air compressors.

When air conditioning is employed on a vehicle, there is no need in cold weather to operate the air compressor inasmuch as it is unlikely that the air conditioning system will be used. At such times it is desirable that the air compressor be inoperative to conserve all of the power of the engine for other uses. Additionally, during warm weather, when it is desirable to use the air conditioning system, it is preferred that the compressor not be a load on the engine starter at engine start-up, but rather that the compressor be actuated automatically at a predetermined engine rpm.

Accordingly, a general object of the invention is to provide improved manual means for rendering the air compressor inoperative during all phases of engine operation when desired.

Another object of the invention is to provide centrifugal weight means for engaging and expanding a coil-wound torque spring to interconnect a drive pulley and an output shaft once the engine reaches a predetermined rpm during engine start-up.

A further object of the invention is to provide a pair of weight members, each of which includes a camming portion on the radial outward surface thereof, for engaging a radially inwardly extending projection formed on the torque spring to expand the latter into driving engagement with a pulley housing.

Still another object of the invention is to provide such a centrifugally-actuated spring clutch wherein a second camming portion is formed on the outer surface of each weight member which may be engaged by manually rotating pin means into contact therewith to thus prevent any outward movement of the weight members under the action of centrifugal force during cold weather.

These and other objects and advantages of the invention will become apparent when reference is made to the following description and drawings, wherein.

Figures 1, 2:
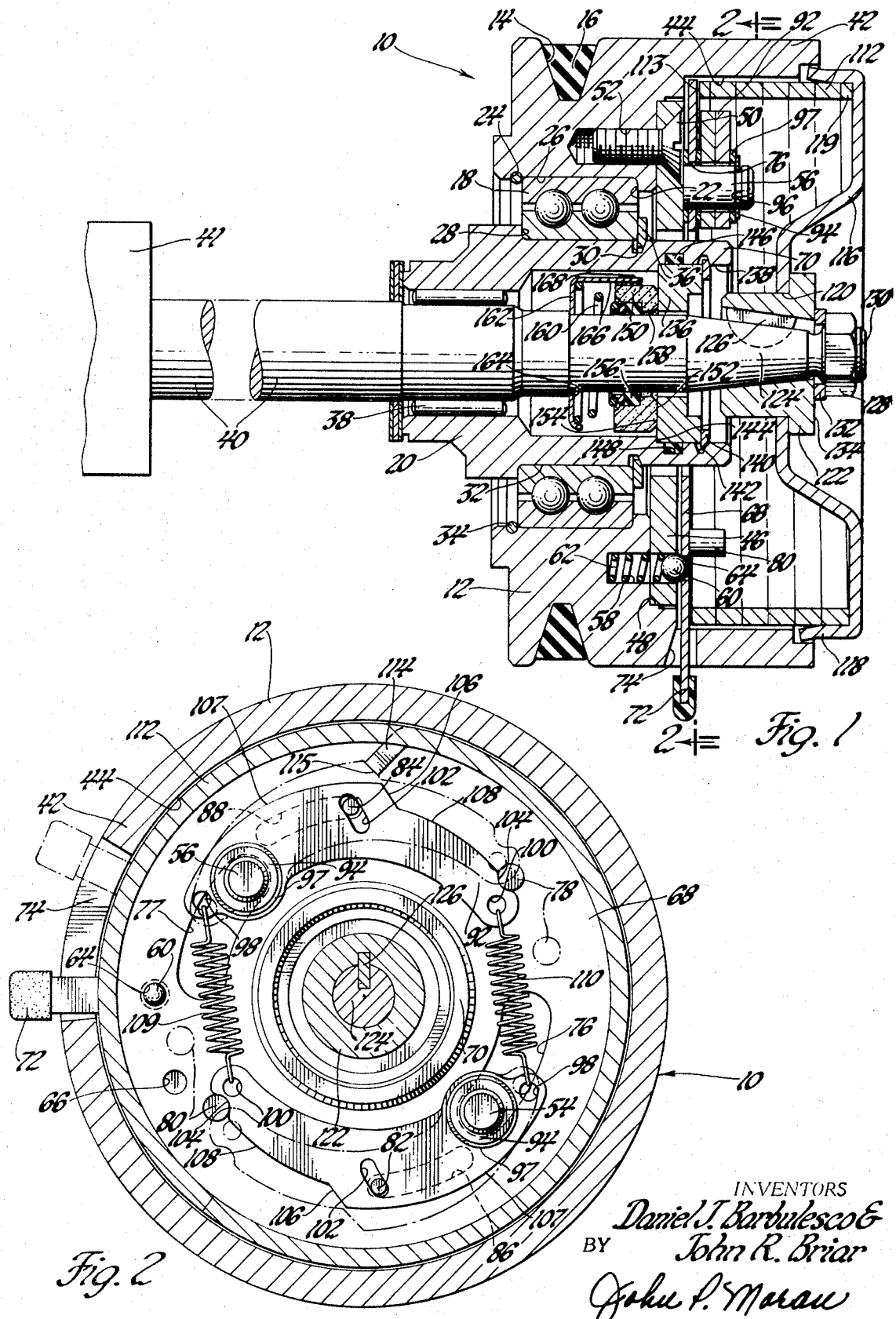
FIG. 1 is a cross-sectional view of the invention.
FIG. 2 is a cross-sectional view taken along the plane of line 2—2 of FIG. 1, as if FIG. 1 were a full round view, and looking in the direction of the arrows.

Referring now to the drawings in greater detail, FIG. 1 illustrates a centrifugal clutch 10 including a cast iron cylindrical housing 12 having a pulley groove 14 formed therein. A drive belt 16 is mounted in the groove 14. The housing 12 is mounted on bearings 18 which, in turn, are mounted around a fixed sleeve member 20. A first shoulder 22 and a first groove 24 are formed adjacent opposite ends of the inner peripheral surface 26 of the housing 12, while a second shoulder 28 and a second groove 30 are formed on the outer peripheral surface 32 of the sleeve member 20. A snap ring 34 is mounted in the groove 24, and a retainer ring 36 is mounted in the groove 30, the shoulders 22 and 28 and the rings 34 and 36 serving to retain the housing 12 and the sleeve member 20 in axial alignment with one another on the bearings 18. The sleeve member 20 is mounted on needle bearings 38 around a compressor shaft 40 which extends through the center of the centrifugal clutch 10 to a compressor 41.

A cylindrical extension 42 is formed on the housing 12 and has a counterbored surface 44 formed therein. A steel back-up plate member 46 is mounted in a recess 48 formed in the bottom of the counterbored surface 44 and is secured therein by a plurality of screws 50 threadedly mounted in threaded openings 52 formed in the housing 12. A pair of oppositely disposed pivot pins 54 and 56 (FIG. 2) are secured to the plate member 46. An opening 58 is formed through the plate member 46 and into the housing 12. A ball member 60 is mounted on a spring 62 in the opening 58 and urged outwardly therefrom by the spring 62 into one or the other of a pair of openings 64 and 66 (FIG. 2) formed in an actuating plate 68, depending upon the latter's rotary position around the end portion 70 of the sleeve member 20. A lever 72 is secured by any suitable means to the actuating plate 68 and extends radially outwardly therefrom through a circumferentially slotted opening 74 formed in the pulley housing 12. A pair of arcuate slots 76 and 77 are formed in the actuating plate 68 to accommodate the extension therethrough of the two pivot pins 54 and 56. A pair of oppositely disposed pins 78 and 80 are secured to the actuating plate 68 in a spaced relationship with the arcuate slots 76 and 77, respectively, as illustrated in FIG. 2. A pair of fixed pins 82 and 84 are also secured to the plate member 46 and extend through two additional arcuate slots 86 and 88 formed in the actuating plate 68 in a spaced relationship with the slots 76 and 77, respectively.

A pair of generally arcuate-shaped weight members 90 and 92 are pivotally mounted on the pivot pins 54 and 56, respectively, and retained thereon by retaining rings 94 mounted in grooves 96 formed adjacent the ends of the pivot pins 54 and 56. A spacer or bearing washer 97 is mounted on each pivot pin 54 and 56 intermediate the respective retaining ring 94 and the adjacent face of the weight member 90 or 92. Each of the weight members 90 and 92 includes respective openings 98 and 100 formed adjacent the ends thereof. Each weight member 90 and 92 also includes an arcuate slot 102 formed through a center portion thereof to accommodate the extension therethrough of the pins 82 and 84. A notch-like groove or cam surface 104 is formed on a radially outer surface of each of the weight members 90 and 92 adjacent the respective openings 100. A cam surface 106 is formed on the radially outer surface of each of the weight members 90 and 92, serving as a shoulder between arcuate surfaces 107 and 108, the surface 107 forming the outer surface of the wider portion of each weight member 90 and 92. Coil springs 109 and 110 interconnect the ends of the weight members 90 and 92 at the respective adjacent openings 98 and 100; the respective pins 82 and 84, abutting against the radial outer portions of the slots 102, limit the radially inward movement of the weight members 90 and 92.

A coil-wound torque spring 112 is mounted within the inner peripheral surface 44 of the pulley housing 12 with the inner free end face 113 thereof positioned slightly apart from the adjacent face of the actuating plate 68, just inside the outer edge thereof. As illustrated in FIG. 2, a radially inwardly extending bent tab or projection 114, terminating in an end face or surface 115, is formed adjacent the free end face 113 of the torque spring 112 on the plane of the cam surfaces 106 formed on the weight members 90 and 92. A contoured connector plate member 116 includes an outer wall portion 118 which surrounds and is secured to the outer end face 119 of the coil-wound torque spring 112 and is rotatable therewith. The contoured plate member 116 is secured at a central opening 120 formed therein to an internally tapered sleeve member 122 which is slidably mounted on a tapered end portion 124 of the compressor shaft 40, to which it is radially connected by a key 126. The sleeve member 122 is retained in place on the tapered shaft portion 124 by a nut 128 threadedly mounted on the threaded end 130 of the compressor shaft 40, the tapered connection serving to axially position the torque spring 112 relative to the pulley housing 12 on the shaft 40. A lock washer 132 is mounted intermediate the outer face 134 of the sleeve member 122 and the adjacent face of the nut 128.

A seat member 136 is mounted in a recess 138 formed in the inner end of the sleeve member 122. A retainer ring 140, mounted in an annular groove 142 formed on the inner peripheral surface of the sleeve member 20, retains the seat member 136 fixed in position against a shoulder 144 formed on the inner surface of the sleeve member 20. An O-ring seal 146 is mounted in an annular groove 148 also formed in the inner peripheral surface of the sleeve member 20 adjacent the outer surface of the fixed seat member 136. A carbon ring 150 is mounted around the compressor shaft 40 with its end face 152 slidably mounted against the face 154 formed on the fixed seat member 136. An O-ring seal 156 abuts against a shoulder 158 formed on the inner surface of the carbon ring 150 to prevent leakage around the compressor shaft 40. A compressed spring 160 abuts against a retainer member 162 which is secured against a shoulder 164 formed on the compressor shaft 40, and urges the O-ring seal 156 against the shoulder 158, retaining the carbon ring 150 in contact with the face 154 of the fixed seat member 136. An axially extending finger 166 extends from the retainer member 162 to the right in FIG. 1 adjacent a projection 168 formed on the carbon ring 150 to effectuate the rotation of the carbon ring 150 with the shaft 40.

OPERATION

Referring now to FIG. 2, it may be noted that, with the lever 72 in the lowermost, or so-called "winter" position in the slot 74, the pins 78 and 80 will be positioned in the notches or cam surfaces 104 adjacent the ends of the weight members 90 and 92, respectively, thus serving to retain the weight members 90 and 92 in their radially innermost positions. The lever 72 is retained in this position by virtue of the ball member 60 being urged by the spring 62 into the opening 64 formed in the actuating plate 68. This is the so-called "winter" or "nonrunning" position when it is desirable that the compressor 41 be inoperative. In this position, the weight members 90 and 92 are prevented from responding to the action of centrifugal force and, hence, the compressor shaft 40 will remain stationary.

When it is desired to have the compressor 41 become operative, i.e., once warm weather arrives, the lever 72 is moved into the uppermost position (FIG. 2) in the slot 74. This will rotate the actuating plate 68 by forcing the ball member 60 out of the opening 64 and further into the opening 58, compressing the spring 62 until the other opening 66 is rotated to a position adjacent the ball member 60. Since the pivot pins 54 and 56 and the limit pins 82 and 84 are secured to the fixed back-up plate 46, the pairs of arcuate slots 76/77 and 86/88 formed in the actuating plate 68 permit the plate 68 to be rotated without interference from the pins 54/56 and 82/84, respectively. It may be noted that the pins 78 and 80, which are secured to the actuating plate 68, are rotated in a clockwise direction out of the respective cam surfaces or notches 104 as a result of the movement of the lever 72. This permits the weight members 90 and 92 to be pivoted outwardly under the action of centrifugal force about the pins 54 and 56, against the force of the interconnecting springs 109 and 110.

Once the freed ends of the weight members 90 and 92 have pivoted outwardly until the radial inner portions of the slots 102 abut against the respective pins 82 and 84, the cam surfaces 106 formed on one of the weight members 90 and 92 will have rotated into contact with the end face 115 of the bent tab 114, the latter having cleared the surface 108 of the respective weight member 90 or 92. Such contact will force the adjacent end portion of the torque spring 112 radially outwardly into contact with the inner surface 44 of the pulley housing 12. This causes the torque spring 112, as well as the connector plate member 116, to be rotated along with the pulley housing 12. Inasmuch as the plate member 116 is secured to the sleeve member 122 and the latter, in turn, is keyed to the compressor shaft 40 by the key 126, rotation of the plate member 116 will rotate the compressor shaft 40 accordingly and thus actuate the compressor 41.

It should be apparent that the invention provides an economical, efficient and readily accessible means for manually rendering the centrifugally-actuated spring clutch unresponsive to centrifugal force. In other words, depending upon the season of the year, the operator may manually render the air conditioning compressor inoperative and thus eliminate any additional load on the engine incurred by having a compressor operating at a time when air conditioning is not desired.

It should be further apparent that the invention provides improved means for expanding a coil-wound torque spring under the action of centrifugal force to interconnect a driving pulley and an output shaft.

While but one embodiment of the invention has been shown and described, other modifications thereof are possible.

We claim:

1. A centrifugal clutch arrangement comprising a cylindrical housing, a pulley groove formed on the outer periphery of said cylindrical housing, an output shaft, bearing means for rotatably mounting said cylindrical housing at one end thereof on said output shaft, a coil-wound torque spring loosely mounted within the inner periphery of the other end of said cylindrical housing, connector means secured between the exposed end of said torque spring and said output shaft, a pair of oppositely disposed weight members pivotally connected to said cylindrical housing radially within said coil-wound torque spring, a cam surface formed on the radially outer surface of each of said weight members, a radially inwardly extending projection formed on the inner free end of said torque spring on the plane of said weight members, and stop means operatively connected to each of said weight members to assure proper circumferential alignment for contact between one of said cam surfaces and said projection under the action of centrifugal force.

2. A centrifugal clutch arrangement comprising a cylindrical housing, a pulley groove formed on the outer periphery of said cylindrical housing, an output shaft, bearing means for rotatably mounting said cylindrical housing on said output shaft, a counterbore formed in one end of said cylindrical housing, a coil-wound torque spring mounted within the inner periphery of said counterbore with a narrow clearance therebetween while said torque spring remains in an unstressed condition, connector means secured between the outer exposed end of said torque spring and said output shaft, a pair of oppositely disposed weight members pivotally mounted on the bottom surface of said counterbore radially within said coil-wound torque spring, a cam surface formed on the radially outer surface of each of said weight members, a bent tab portion formed on the inner free end of said torque spring on the plane of said weight members, and stop means operatively connected to each of said weight members to assure proper rotary alignment for contact between one of said cam surfaces and said bent tab portion under the action of centrifugal force.

3. A centrifugal clutch arrangement comprising a cylindrical housing, a pulley groove formed on the outer periphery of said cylindrical housing, an output shaft, bearing means for rotatably mounting said cylindrical housing on said output shaft, a counterbore formed in one end of said cylindrical housing, a coil-wound torque spring mounted within the inner periphery of said counterbore, a connector plate secured between the outwardly extending end of said torque spring and said output shaft, a back-up plate member secured to the bottom surface of said counterbore, a pair of oppositely disposed pivot pins formed on said back-up plate member, a pair of weight members pivotally mounted on said pivot pins, a pair of springs interconnecting adjacent ends of said weight members, a cam surface formed on the radial outer surface of each of said weight members, a bent tab portion formed on the inner free end of said torque spring, and stop means operatively connected to each of said weight members to assure proper alignment for rotary contact between one of said cam surfaces and said bent tab portion under the action of centrifugal force, said torque spring being urged radially outwardly into frictional contact with said cylindrical housing upon contact of said bent tab portion by said one of said cam surfaces, thereby driving said output shaft via said connector plate.

4. A centrifugal clutch arrangement comprising a cylindrical housing, a pulley groove formed on the outer periphery of said cylindrical housing, an output shaft, bearing means for rotatably mounting said cylindrical housing at one end thereof on said output shaft, a coil-wound torque spring loosely mounted within the inner periphery of the other end of said cylindrical housing, connector means secured between the extended end of said torque spring and said output shaft, a pair of oppositely disposed weight members pivotally connected to said cylindrical housing radially within said coil-wound torque spring, first and second cam surfaces formed on the radially outer surface of each of said weight members, a radially inwardly extending projection formed on the inner free end of said torque spring on the plane of said weight members, stop means operatively connected to each of said weight members to assure proper circumferential alignment for contact between one of said first cam surfaces and said projection under the action of centrifugal force, and manually-actuated means for cooperating with said second cam surfaces to render said weight members inoperative under the action of centrifugal force.

5. A centrifugal clutch arrangement comprising a cylindrical housing, a pulley groove formed on the outer periphery of said cylindrical housing, an output shaft, bearing means for rotatably mounting said cylindrical housing at one end thereof on said output shaft, a coil-wound torque spring loosely mounted within the inner periphery of the other end of said cylindrical housing, connector means secured between the outer end of said torque spring and said output shaft, a pair of oppositely disposed weight member pivotally connected to said cylindrical housing radially within said coil-wound torque spring, first and second cam surfaces formed on the radially outer surface of each of said weight members, a radially inwardly extending projection formed on the inner free end of said torque spring on the plane of said weight members, stop means operatively connected to each of said weight members to assure proper circumferential alignment for contact between one of said first cam surfaces and said radially inwardly extending projection under the action of centrifugal force, a plate member rotatably mounted intermediate said bearing means and the adjacent face of said weight members, a pair of oppositely disposed pin members formed on said plate member, and lever means on said plate member for manually rotating said plate member to move said pin members into contact with said respective second cam surfaces, thereby rendering said weight members inoperative under the action of centrifugal force.

6. A centrifugal clutch arrangement comprising a cylindrical housing, a pulley groove formed on the outer periphery of said cylindrical housing, an output shaft, bearing means for rotatably mounting said cylindrical housing on said output shaft, a counterbore formed in one end of said cylindrical housing, a coil-wound torque spring mounted within the inner periphery of said counterbore, a cup-shaped connector plate secured between the outer exposed end of said torque spring and an end portion of said output shaft, a pair of oppositely disposed pivot pins formed on the bottom surface of said counterbore, a pair of weight members pivotally mounted on said pivot pins radially within said coil-wound torque spring, first and second cam surfaces formed on the radially outer surface of each of said weight members, a bent tab portion formed on the inner free end of said torque spring, stop means operatively connected to each of said weight members to assure proper alignment for rotary contact between one of said first cam surfaces and said bent tab portion under the action of centrifugal force, a plate member rotatably mounted intermediate said bottom surface of said counterbore and the adjacent face of said weight members, a pair of arcuate slots formed in said plate member for mounting around said pair of oppositely disposed pivot pins, a pair of oppositely disposed fixed pin members formed on said plate member, lever means on said plate member for manually rotating said plate member to move said fixed pin members into contact with said respective second cam surfaces, thereby rendering said weight members inoperative under the action of centrifugal force, and means for automatically retaining said plate member in position once manually rotated.

* * * * *